United States Patent Office 2,713,775
Patented July 26, 1955

2,713,775

RECOVERY OF SALT FREE LIQUID FROM LIQUID HAVING SALTS DISSOLVED THEREIN

John E. Cottle, Bartlesville, Okla., assignor to Phillips Petroleum Company, a corporation of Delaware Application November 6, 1953, Serial No. 390,564

17 Claims. (Cl. 62—1)

This invention relates to the recovery of salt-free liquefiable inorganic materials from a source of the said materials containing salt dissolved therein. In its preferred embodiment, this invention relates to the recovery of salt-free ammonia from an underground storage system. In still another embodiment, this invention relates to the recovery of a salt-free liquefiable inorganic compound from an underground storage cavern wherein the stored material contains salts dissolved from the cavern walls.

This invention can be advantageously practiced whenever liquids which will dissolve salts are stored underground particularly in salt caverns or whenever it is desirable to recover salt-free liquid from the liquid containing salts dissolved therein. Where the term salt is used in this specification and the appended claims, I am using salt in its technical sense and am not limited to sodium chloride.

Liquid ammonia will dissolve relatively large amounts of salt and this material is being stored underground at the present time. For this reason, I will discuss my invention in terms of ammonia having salts dissolved therein. Examples of other liquids which may be recovered salt-free by the practice of this invention are liquid chlorine, hydrogen sulfide, and sulfur dioxide.

Ammonia has many industrial uses and, in particular, as an intermediate for further compounding or reacting material in production of other chemicals. In many cases, the ammonia is manufactured at a place removed from the place of use. Some of these uses are seasonal in nature, this being especially true in the fertilizer industry. It is desirable to manufacture and ship the ammonia on a year round basis since the manufacturing equipment for ammonia is expensive and it is uneconomical to operate such plants on a part-time basis. It is, therefore, deesirable to provide low cost storage facilities for the ammonia where it can be stored during the off-season months and subsequently used. The problem has been largely solved by the use of underground storage caverns. It has been found that by drilling into salt beds and dissolving out a portion of the salt, a fluid tight storage cavern can be provided.

A disadvantage of the above system is that most salts, and especially sodium chloride, are soluble in ammonia. This dissolved salt must be removed before the ammonia is used. This can be done by evaporation, however, the salt tends to crystallize out on the heat exchange means used in the evaporating system. This salt builds up on the heat exchange means, such as coils, on the inner surface of the still, etc., materially reduces the heat exchange efficiency and also tends to severely corrode the metal of the heat exchanger.

I have found that the deposition of salt directly on the heat exchange means during the evaporation of ammonia can be prevented by covering the heat exchanger with an inert liquid, the said liquid being insoluble in the ammonia, having a higher density than ammonia, and being a non-solvent for salt. As the ammonia is evaporated, the salt will become more concentrated in the remaining ammonia and will eventually begin to crystallize out. Instead of depositing directly upon the heat exchanger, the salt will be deposited in or on the inert liquid and will settle as a slush in the bottom of the container. Although my invention has particular applicability to anhydrous ammonia stored underground in salt beds, it is not limited thereto. For example, any underground cavern would probably contain some ammonia soluble salts. Also, ammonia contaminated with salts from other sources can be recovered by my method. My invention is also applicable to other low-boiling liquids which might be stored in a container wherein the container walls are, at least, partially soluble in the stored liquid.

As was hereinabove indicated, any liquid which is inert to the ammonia, non-corrosive to the heat exchanger, insoluble in the ammonia, heavier than ammonia, a non-solvent for salt, and generally having a higher boiling point than the ammonia, will be satisfactory in the process of my invention. The hydrocarbon oils are particularly useful. Examples of these materials are kerosene and similar light gas oils, pentane, n-hexane, n-heptane, and the like. Other materials, such as isohexane and isopheptane, are operable, but are more costly and ordinarily would not be used. Heavier organic oils can be used, but we prefer to use the light gas oils, since they are in plentiful supply at a low cost.

An object of my invention is to provide a means for recovering salt-free liquefiable inorganic material from a source of the inorganic material stored underground. Another object of my invention is to provide a means for recovering salt-free ammonia from an ammonia source which contains salts dissolved therein. Another object of my invention is to provide a means for recovering salt-free anhydrous ammonia from ammonia which has been stored underground. Still another object of my invention is to prevent salt build-up on a heat exchanger when an inorganic liquid containing dissolved salts is evaporated. Still other objects and advantages of my invention will be apparent upon reading this specification and the accompanying claims.

In the practice of my invention, anhydrous ammonia is taken from the ammonia production plant and is stored in underground storage caverns formed in subterranean salt formations. These caverns may be man made or natural formations. They may be made for this purpose, or they may have been abandoned salt working caverns. In any case, a shaft is sunk into the ground from the earth's surface to the roof of the cavern. The various conduits required for storing and removing the ammonia pass through this shaft. The top of the shaft is securely sealed against ammonia escaping from the cavern through said shaft. The stored ammonia will dissolve salt from the walls of the cavern, and this salt must be removed from the ammonia before the ammonia is further processed. As was hereinbefore indicated, this can be easily accomplished by vaporizing the ammonia and recondensing the vapor. However, as the ammonia evaporates, the salt crystallizes out and forms a hard crust on the containing vessel and the heat exchange means used to supply the energy necessary to vaporize the ammonia. By using an inert liquid to cover the heat exchanger and the bottom of the containing vessel, the salt will settle in the said liquid as a soft slush and will not form a hard crust as a deposit on the apparatus.

I will further describe my invention in one of its preferred embodiments by referring to the attached drawings which are made a part of this disclosure.

I will describe my invention in terms of one of its preferred embodiments wherein the ammonia is underground stored anhydrous ammonia and the inert liquid is pentane. However, it should be understood that I do not limit my invention to this embodiment since any of the conditions hereinabove stated may apply. The following description is for illustrative purposes only.

Figure 1:
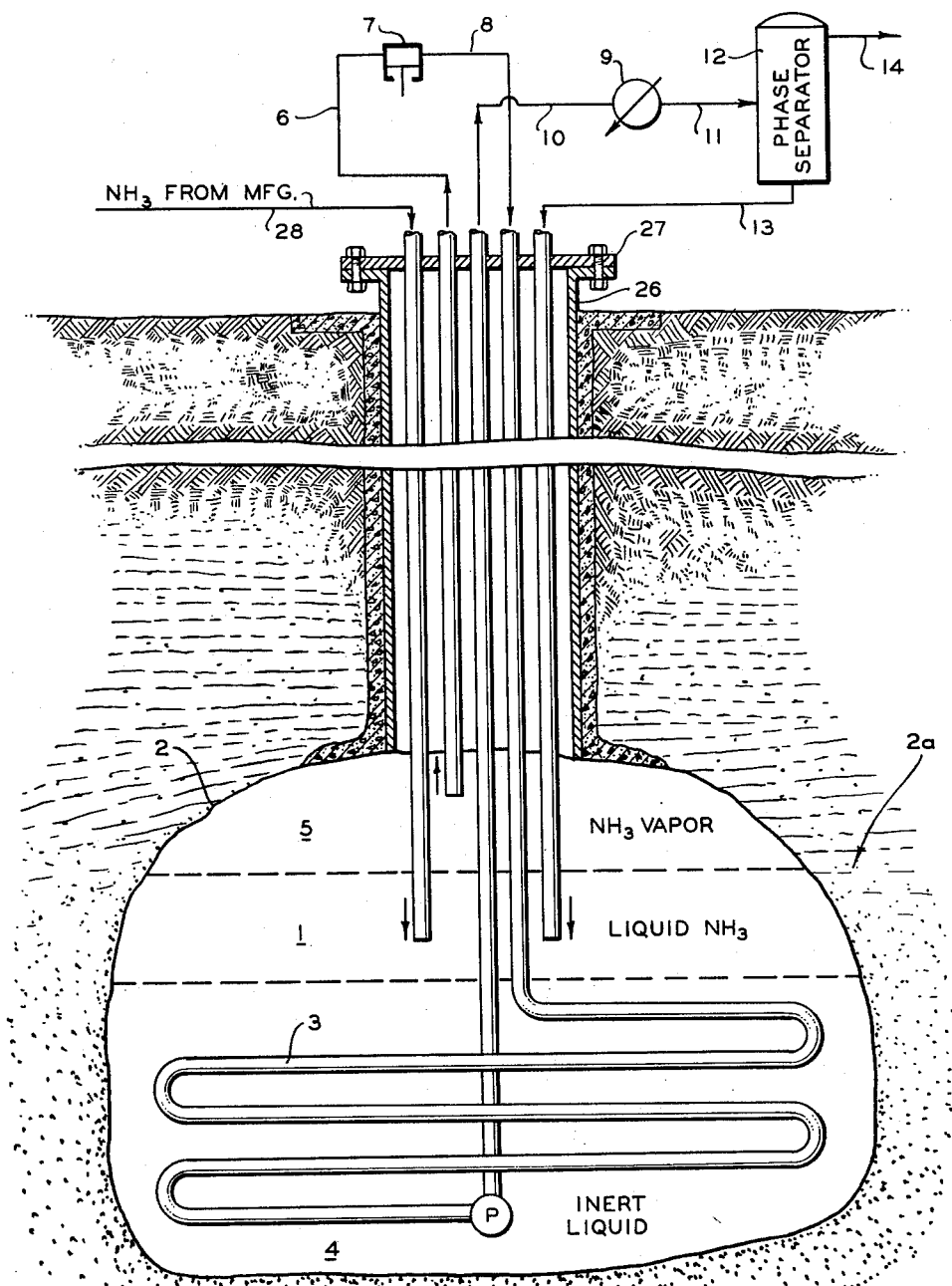
Figure 1 is a schematic drawing showing an embodiment of my invention wherein the ammonia is evaporated directly from the underground storage cavern.

Referring to Figure 1, anhydrous liquid ammonia 1 is pumped to underground storage cavern 2 formed in a subterranean salt formation 2a via conduit 28. Heat exchanger 3 is submerged in the liquid ammonia and is covered by pentane (inert liquid) 4. Vaporous ammonia 5 is taken from the top of the storage container via conduit 6 to compressor 7. The ammonia vapor is heated as a result of the compression and these hot vapors are pumped to the heat exchanger via conduit 8 and in said heat exchanger the ammonia is liquefied. Heat is given up to the pentane 4 which in turn gives up heat to the liquid ammonia 1, causing it to evaporate. As the liquid ammonia 1 evaporates, dissolved salts are crystallized out and settle in the pentane to the bottom of the cavern 2. The liquefied ammonia from the heat exchanger 3 then passes to cooler 9 via conduit 10, wherein said cooler additional heat is removed, thereby maintaining the ammonia in a liquid state. The cooled ammonia then passes via conduit 11 to phase separator 12 where the ammonia can be separated from any pentane which may have been evaporated along with the ammonia. The pentane is returned to the cavern 2 via conduit 13 and the ammonia is removed via conduit 14.

All of the conduits 6, 8, 10, 13 and 28 are encased in a central shaft 26 which is sealed with cap 27.

Figure 2:
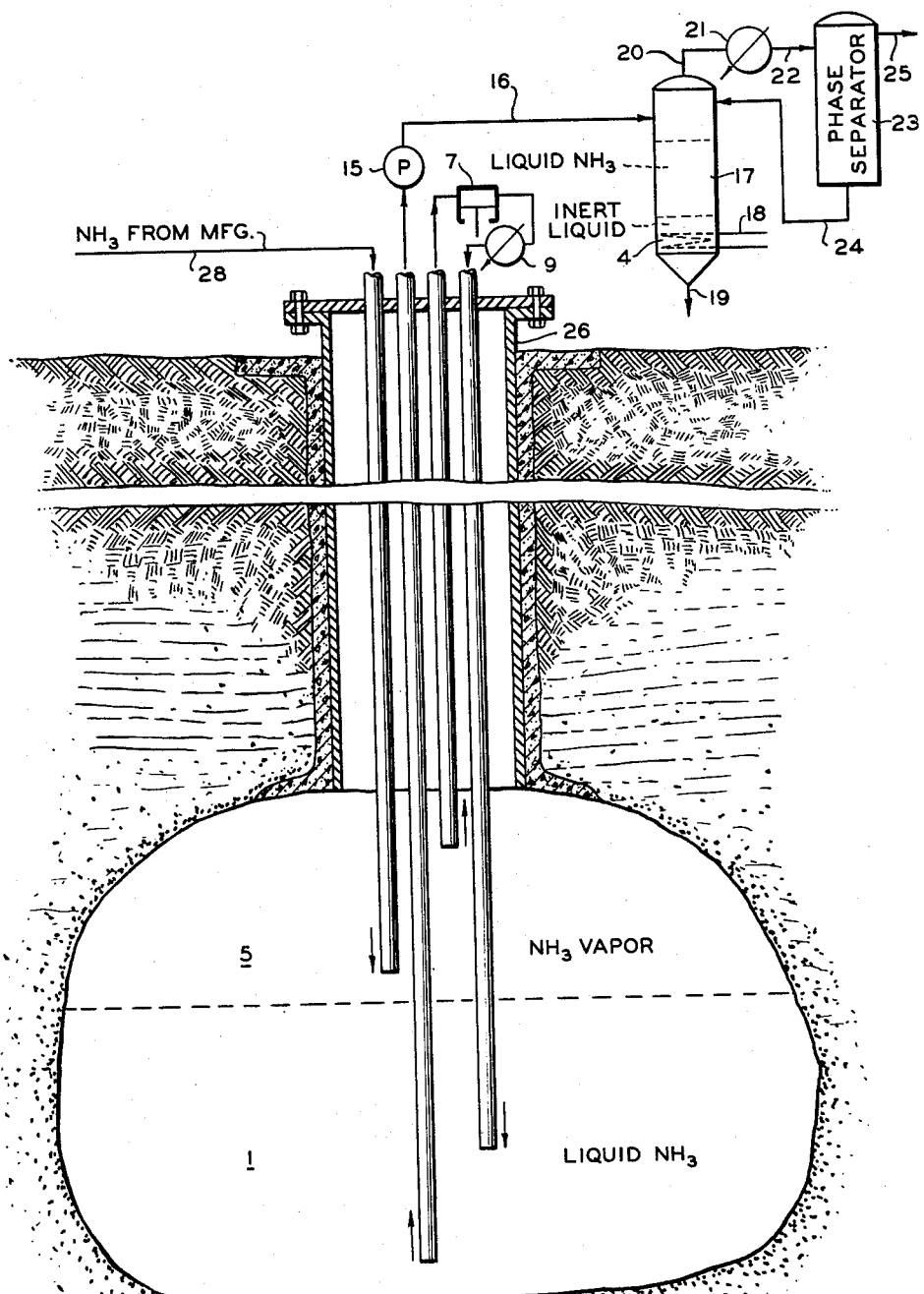
Figure 2 is a schematic drawing showing an embodiment of my invention wherein the ammonia containing salt is pumped to an evaporator from which the ammonia is evaporated.

Another embodiment of my invention is shown in Figure 2. In discussing this embodiment, I will describe a system of recovering salt-free anyhydrous ammonia from underground storage wherein pentane is used as the inert liquid. This source of ammonia and the choice of the inert liquid is for illustrative purposes only and they should not be considered as limiting in any manner. These conditions were primarily selected in order that a ready comparison can be made to the previous description of the underground storage embodiment of my invention. This embodiment of my invention would be particularly useful where it is desirable to recover salt-free ammonia from a source of contaminated ammonia containing dissolved salts in a chemical process.

Referring to Figure 2, liquid ammonia 1 is removed from underground storage cavern 2 via means of pump 15 and conduit 16 to evaporator 17. This evaporator is equipped with a heater 18 which is in turn covered by pentane 4. The pentane picks up heat from the heater and in turn gives up heat to the liquid ammonia which has been removed from storage and floats on top of the pentane. The ammonia is caused to evaporate, causing dissolved salts to crystallize out. These salts settle into the pentane and collect in the bottom of the evaporator. Periodically the salt is removed via conduit 19 to a centrifuge (not shown) or other separating means where pentane is recovered and returned to the evaporator. The evaporated ammonia is removed from evaporator 17 via conduit 20 to condenser 21 where the ammonia vapor and any pentane which may have been evaporated are liquefied. These condensed materials then pass via conduit 22 to phase separator 23. The heavier pentane is removed from the bottom of the separator and returned to the evaporator via conduit 24. The salt-free liquid ammonia is removed from the separator via conduit 25.

My invention has been described in two of its embodiments and wherein liquid ammonia was the stored liquid. Those skilled in the art will readily understand that this invention is applicable whenever liquids are stored in caverns, and wherein the said cavern walls are, at least, partially soluble in the said stored liquid. Those skilled in the art will see many advantages and uses of my invention and will recognize that many modifications can be made without departing from the scope thereof.

I claim:

1. In the process for the recovery of salt-free inorganic liquid from a system comprising the said liquid containing salts dissolved therein and wherein the liquid is caused to evaporate from said system by heat supplied through a heat exchanger submerged in said salt containing liquid, the improvement comprising displacing said salt containing liquid around said heat exchanger with a liquid inert to the said first liquid, heat exchanger and salt, being heavier than and having a higher boiling point than the first liquid and suppling heat from said heat exchanger through said inert liquid to evaporate said salt containing liquid.

2. In the process for the recovery of salt-free inorganic liquefiable material from a system comprising an underground storage cavern containing the inorganic liquefiable material at least partially in the liquid state, the said liquid containing salts dissolved therein and wherein said liquid is caused to evaporate by heat supplied from a heat exchanger submerged in said liquid, the improvement comprising displacing said salt containing liquid around said heat exchanger with a liquid inert to the said first liquid, heat exchanger and salt, being heavier than and having a higher boiling point than the said first liquid and supplying heat for evaporating said salt containing liquid from said heat exchanger through said inert liquid.

3. The improvement of claim 2 wherein the inert liquid is a hydrocarbon, and the first liquid is ammonia.

4. In the process of recovering salt-free liquid from an underground storage system comprising an inorganic liquid with salts dissolved therein, the steps comprising floating said inorganic liquid on a second liquid, said second liquid being substantially inert to, having a boiling point higher than, and being immiscible with first said liquid and in which said salts are substantially insoluble; heating said second liquid to a temperature higher than the boiling point of said first liquid at the prevailing pressure so as to cause said inorganic liquid to vaporize thereby causing the salts to be deposited in the inert liquid; and recovering the evaporated inorganic liquid substantially salt free.

5. In the process of claim 4, the inert liquid being a hydrocarbon and the said first liquid being selected from the group consisting of ammonia, sulfur dioxide, hydrogen sulfide and chlorine.

6. In the process of claim 4, the inert liquid being a hydrocarbon, and the first liquid being ammonia.

7. In a process for recovering salt-free anhydrous ammonia from underground liquid anhydrous ammonia storage, the steps comprising applying heat to a liquid heavier than, having a boiling point higher than, and substantially immiscible with ammonia, contacting the liquid ammonia with the said heavier liquid, thereby causing the ammonia to evaporate and leaving the salt in the heavier liquid, and recovering the salt-free anhydrous ammonia.

8. In the process of claim 7, the heavier liquid being a hydrocarbon.

9. In the process of claim 8, the hydrocarbon being a light gas oil.

10. In the process of claim 8, the hydrocarbon being kerosene.

11. In the process of claim 8, the hydrocarbon being pentane.

12. In the process of claim 8, the hydrocarbon being n-hexane.

13. In the process of claim 8, the hydrocarbon being n-heptane.

14. An apparatus for the recovery of salt-free liquefiable inorganic material from liquid inorganic material containing salts dissolved therein, the apparatus comprising, in combination, a vessel containing a bottom inert liquid phase, an intermediate liquid phase containing salts dissolved therein, an upper vapor phase; means for introducing liquid into said vessel; a heat exchanger disposed and submerged in the said inert liquid phase; means for supplying heat to said heat exchanger; a condenser; a conduit means connecting the aforesaid vapor phase and the inlet of said condenser; a phase separator; a conduit means connecting the outlet of said condenser and the inlet of said phase separator; a conduit means connecting the bottom of said phase separator and the aforesaid vessel; and an outlet means from the phase separator so positioned in said separator as to be in communication with an upper liquid phase in said separator.

15. An apparatus for recovery of salt-free liquefiable inorganic material from liquid inorganic material containing salts dissolved therein, the apparatus comprising, in combination, an underground storage cavern formed in a subterranean salt formation, said cavern containing a bottom insert phase, an intermediate liquid phase containing salts dissolved therein, and an upper vaporous phase; a heat exchanger disposed and submerged in said inert liquid phase; a compressor located above the earth surface; a conduit means connecting said vapor phase and the inlet of said compressor; a conduit means connecting the outlet of said compressor and the said heat exchanger; a phase separator; a conduit means connecting said heat exchanger and said phase separator, said conduit means entering said phase separator at a position intermediate its top and bottom; a conduit means connecting the bottom of said phase separator and the aforesaid cavern; and an outlet means from the phase separator positioned in said separator intermediate its top and bottom and communicating with the upper liquid phase of said separator.

16. An apparatus for recovery of salt-free anhydrous ammonia from liquid anhydrous ammonia containing salts dissolved therein, the apparatus comprising, in combination, an underground storage cavern formed in a subterranean salt formation, said cavern containing a bottom inert liquid phase, an intermediate anhydrous liquid ammonia phase containing salts dissolved therein, and an upper vaporous ammonia phase; a shaft communicating between the roof of said cavern to the earth surface; a conduit means passing through said shaft for adding liquid anhydrous ammonia to said cavern; a heat exchanger disposed and submerged in the said inert liquid phase; a compressor; a conduit means passing through said shaft and connecting said vapor phase and the inlet of said compressor; a conduit means passing through said shaft connecting the outlet of said compressor and the said heat exchanger; a phase separator; a conduit means passing through said shaft connecting said heat exchanger to said phase separator; a conduit means passing through said shaft connecting the bottom of said phase separator and the said underground cavern; an outlet means from said separator positioned so as to be in communication with the upper liquid phase in said separator; and a cap over said shaft, the said cap being fitted fluid tight to said shaft and to said conduit means passing through said shaft.

17. An apparatus for storing anhydrous ammonia in an underground salt cavern and recovering salt-free anhydrous ammonia, the said apparatus comprising, in combination, an underground storage cavern formed in a subterranean salt formation; a shaft communicating between the roof of said cavern and the earth's surface; an inlet conduit passing through said shaft; a cap covering said shaft and being sealed fluid tight to said shaft and said conduit; an evaporator containing therein a bottom inert liquid phase, an intermediate anhydrous liquid ammonia phase and an upper vaporous ammonia phase; a heat exchanger disposed and submerged in said inert liquid phase; means for applying heat to said heat exchanger; a conduit means communicating from a position below the liquid level in said covern to the inlet of said evaporator, the said conduit means passing through the aforesaid shaft and cap thereof, and having a fluid tight seal to said cap; a pumping means operatively connected with last said conduit means so as to pump liquid from said cavern to said evaporator through said conduit; a condenser; a conduit means communicating between the said vapor phase of the said evaporator and the inlet of said condenser; a phase separator; a conduit means connecting the outlet of said condenser to the inlet of said phase separator; a conduit means connecting the bottom of said phase separator to the said evaporator; and an outlet means from said phase separator communicating with the upper phase of said phase separator.

References Cited in the file of this patent

UNITED STATES PATENTS

| | | |
|---|---|---|
| 335,427 | Clapp | Feb. 2, 1886 |
| 1,873,629 | Patton | Aug. 23, 1932 |
| 2,090,941 | Dreyfus | Aug. 24, 1937 |
| 2,461,010 | Teter et al. | Feb. 8, 1949 |